UNITED STATES PATENT OFFICE.

DANIEL F. BOWKER, OF FITZWILLIAM, ASSIGNOR TO PARGETIZED CAN COMPANY, OF KEENE, NEW HAMPSHIRE.

IMPROVEMENT IN COMPOSITIONS FOR COATING THE INSIDES OF BARRELS, &c.

Specification forming part of Letters Patent No. 185,483, dated December 19, 1876; application filed December 11, 1876.

*To all whom it may concern:*

Be it known that I, DANIEL F. BOWKER, of Fitzwilliam, in the county of Cheshire and State of New Hampshire, have invented certain new and useful Improvements in Coating the Inside of Vessels, rendering them impervious to kerosene and other oils; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to render barrels, kegs, tanks, and vessels of all kinds—including wood, paper, and metal—capable of resisting the action of kerosene and other oils. It consists in coating the inside of these vessels with my preparation of a sufficient thickness to prevent the oil from coming in contact with the surface of the barrel or other vessel.

This compound is formed of ingredients all of which are insoluble in oil, and are so combined as to render the coating sufficiently elastic to prevent its injury by the shrinking or swelling of the barrel or other vessel. It is also of such a nature that it will not harden or crack after long exposure in dry places.

The following are the proportionate parts of the several ingredients forming my compound: Glue, one pound; water, one quart; glycerine, one-fourth pound; chloride of sodium, two ounces; and nitric acid, one-eighth of an ounce.

For my particular purpose the above proportions seem to be most efficient; but, of course, the amount of nitric acid may be varied, as well as any of the other ingredients, without prejudice to the spirit of my invention.

The ingredients are prepared as follows: Soak the glue from ten to twelve hours in the water; then add the other ingredients, and boil the whole about two hours at 200° Fahrenheit. This compound is applied to the surface in its heated condition.

Having thus described my invention, I claim—

The composition herein described, consisting of glue, water, glycerine, nitric acid, and chloride of sodium, substantially as set forth.

In testimony that I claim the foregoing as my own I affix my signature in presence of two witnesses.

DANIEL F. BOWKER.

Witnesses:
HIRAM BLAKE,
ALONZO CUMMINGS.